UNITED STATES PATENT OFFICE 2,219,332

REFRACTORY GLASS

Marcello Pirani, South Kenton, England, assignor to General Electric Company, a corporation of New York No Drawing. Application October 14, 1938, Serial No. 235,097. In Great Britain October 27, 1937

6 Claims. (Cl. 106—36.1)

This invention relates to refractory materials that are partly or wholly vitreous. "Partly or wholly vitreous" implies that the material is impervious to air; nothing is necessarily implied about the transparency of the material, but materials according to the invention, if not transparent, are usually appreciably translucent in layers ½ mm. thick.

The object of this invention is to provide such materials that have melting points not below 1550° C., but have thermal expansion coefficients substantially higher than that of vitreous silica. Since the melting point of a vitreous material is not entirely definite, it is to be determined by a method which gives to the melting point of vitreous silica its accepted value (1715° C.); the thermal expansion coefficient of vitreous silica is $0.55 \times 10^{-6}$ per ° C.

Materials with these properties are useful as intermediate glasses in the sealing of conductors through quartz and for other known purposes.

According to the invention a partly or wholly vitreous material having a melting point not below 1550° C. and a thermal expansion substantially greater than $0.55 \times 10^{-6}$ per ° C. contains at least 75% silica, at least 1% of (beryllia+ceria), at least 2% of (ceria+thoria) and not more than 7% of other oxides. "Ceria" means the commercial product containing some 50% $CeO_2$, 30% $La_2O_3$ and 20% other oxides. Another way of expressing the essential content of the refractory oxide shown in the table on this page is that the compositions embodying my invention should contain at least three per cent of two oxides of the group consisting of beryllia, ceria and thoria.

Beryllia appears to be particularly efficient in producing the desired combination of high melting point and high expansion. Its presence is therefore generally desirable. The presence of thoria or ceria is then generally desirable, but not always necessary, in order to promote solution of the beryllia. But it appears that ceria can perform to some extent the function of beryllia, though it usually gives a rather lower melting point for a given expansion; accordingly beryllia is not essential.

It has been found that the said other oxides may include those of calcium, magnesium, zirconium, aluminium, titanium, tungsten, molybdenum or tantalum. They all, except possibly zirconia, increase the expansion coefficient if present in sufficient quantity; but then they all, except possibly zirconia and titania, decrease the melting point considerably. Titanium produces a coloured glass and may sometimes be undesirable on this ground. Zirconia, with or without lime, is generally the preferable "other oxides;" but small quantities of alkalis, for example 0.7% $Na_2O$, may be added if a clear glass is required; in such small quantities, the alkalis have little effect on the expansion coefficient, but reduce the melting point appreciably.

The following compositions have been found especially suitable for materials according to the invention; it will be seen that the expansion coefficient can be varied over a considerable range; an entry $x$ in the last row of the following table means that the expansion coefficient is $x \times 10^{-6}$ per ° C.

|   | I | II | IIa | III | IV | V | Va | VI | VII | VIII | IX |
|---|---|----|-----|-----|----|----|-----|----|-----|------|-----|
| $SiO_2$ | 95.4 | 94 | 94 | 91 | 93 | 86.3 | 86.3 | 87 | 81.5 | 80 | 83.3 |
| $ThO_2$ | 2.0 | 4 |   | 6 |   | 10 |   | 10 | 10 | 10 | 5 |
| Ceria |   |   | 4 |   |   |   | 10 |   |   |   | 5 |
| BeO | 1.0 | 2 | 2 | 3 | 7 | 2 | 2 | 2 | 5 | 5 |   |
| $ZrO_2$ | 1.6 |   |   |   |   |   |   |   | 2 | 2 | 3 |
| CaO |   |   |   |   |   | 1.0 | 1.0 | 1 | 1.5 | 3 | 3 |
| $Na_2O$ |   |   |   |   |   | 0.7 | 0.7 |   |   |   | 0.7 |
| Expansion ($x$) | 0.8 | 0.9 | 1.1 | 1.0 | 1.3 | 0.9 | 1.6 | 1.6 | 2.1 | 2.7 | 2.6 |

Materials according to the invention are, of course, difficult to found in crucibles, so as to produce a true glass, but it is possible so to found them in zircon silicate crucibles prepared in the manner described and claimed in British Patent Specification No. 492,394. Such crucible will withstand temperatures of nearly 2,000° C., and can be heated to the founding temperature of the material in an oxy-hydrogen flame. The crucibles are not materially attacked by the molten material. The materials should be founded in air, not in a reducing atmosphere.

But materials according to the invention can also be made by first forming a coherent, but not vitreous, rod of the constituents by the methods of the ceramic arts, and then melting the rod in a flame. This process is described in British Patent Specification No. 486,444 where it is prescribed that the coherent rod shall be formed by sintering; but sintering is not always necessary; if sufficient cohesion can be obtained by pressing, that will serve.

In order to make the conversion to the vitreous material complete, it may sometimes be necessary to repeat the process, using the rod resulting from the process just described as the coherent rod in another such process.

In one method of carrying out this process that has proved convenient, the coherent rod is fed steadily downwards through the bore of a carbon tube. A flame is directed on the rod where it issues from the bore, so as to melt it; the molten material is drawn away at an appropriate rate by a mandrel moved downwards, to whose top the first portion of the molten material adheres.

When a vitreous, or partially vitreous, rod has been formed, it may be converted into a tube by wrapping the rod, as it melts, round a mandrel, which may conveniently be of carbon.

But it is not necessary that a material according to the invention should be even partially vitreous, according to the aforesaid definition, before it is brought into the form in which it is finally used. Thus when the material is used as an intermediate glass, it may be prepared as a ceramic rod and converted partly or wholly into glass during the process of working it in the flame by methods used in preparing glasses having a very high silica content in combination with small amounts of thoria, zirconia, calcium oxide and beryllia such as described and claimed in copending application Serial No. 177,522, filed December 1, 1937, in the names of Marcello Pirani and John H. Partridge and assigned to the same assignee as the present application.

Having now particularly described and ascertained the nature of my said invention and in what manner the same is to be performed, I declare that what I claim is:

1. A partly or wholly vitreous material having a melting point not below 1550° C. and a thermal expansion coefficient substantially greater than $0.55 \times 10^{-6}$ per °C., containing at least 75% of silica, at least 1% of (beryllia+ceria) at least 2% of (thoria+ceria), and not more than 7% of other oxides.

2. A refractory material according to claim 1, wherein the said other oxides are oxides of one or more of the metals calcium, magnesium, zirconium, aluminium, titanium, tungsten, molybdenum, tantalum, potassium or sodium.

3. A highly refractory glassy material comprising essentially at least 75 per cent of silica and at least 3 per cent of at least two oxides of the group consisting of beryllia, ceria and thoria, and not more than 7 per cent of other oxides which includes less than 1 per cent of alkali.

4. A highly refractory glassy material comprising essentially at least 75 per cent of silica, a content of at least 3 per cent of oxide of the group consisting of beryllia, ceria and thoria, at least some of the oxide chosen from said group consisting of beryllia, and a content of other modifying oxides amounting to less than 7 per cent.

5. A highly refractory glassy material comprising essentially about 87 per cent of silica, about 10 per cent of thoria, about 2 per cent of beryllia and not more than a few per cent alkaline ingredients.

6. A vitreous material consisting of about 85 per cent silica, about 5 per cent thoria, about 5 per cent ceria, about 3 per cent zirconia, and a few per cent of alkaline ingredients including calcium oxide.

MARCELLO PIRANI.